United States Patent [19]
Redman et al.

[11] Patent Number: 5,978,476
[45] Date of Patent: Nov. 2, 1999

[54] ACCESS RESTRICTION TO CIRCUIT DESIGNS

[75] Inventors: Scott Redman, Fremont; Dennis Mak, Mountain View; Richard Terrill, Santa Clara, all of Calif.

[73] Assignee: Altera Corporation, San Jose, Calif.

[21] Appl. No.: 08/908,084

[22] Filed: Aug. 11, 1997

Related U.S. Application Data

[60] Provisional application No. 60/026,251, Sep. 17, 1996.

[51] Int. Cl.6 .................................. H04L 9/32; H04L 9/00
[52] U.S. Cl. ......................... 380/4; 380/9; 380/23; 380/25; 380/49; 380/50; 395/168; 395/187.01
[58] Field of Search .......................... 395/186, 187.01, 395/188.01; 380/4, 9, 23, 25, 49, 50, 59, 29, 30

[56] References Cited

U.S. PATENT DOCUMENTS

| | | | |
|---|---|---|---|
| 3,798,605 | 3/1974 | Feistel | 380/25 |
| 4,128,874 | 12/1978 | Pertl et al. | 380/25 |
| 4,956,769 | 9/1990 | Smith | 380/25 X |
| 5,018,096 | 5/1991 | Aoyama | 380/4 X |
| 5,065,429 | 11/1991 | Lang | 380/25 |
| 5,469,564 | 11/1995 | Junya | 395/188.01 |

*Primary Examiner*—Bernarr E. Gregory
*Attorney, Agent, or Firm*—Townsend & Townsend & Crew LLP

[57] ABSTRACT

A computerized system restricts full revelation of certain information to a user, while also performing limited processing of the information for the user for evaluation. The information is encrypted and therefore may be widely distributed without fear of revelation. An authorization code from the user specifies the type(s) of processing that are permitted, wherein different types of processing produce different type(s) of output that reveal to different degrees the information. The type(s) of output include output which represent more than mere reproduction of the information. A particularly appropriate implementation of the present invention is in the area of Electronic Design Automation (EDA) for logic design.

15 Claims, 4 Drawing Sheets

ACCESS RESTRICTION TO CIRCUIT DESIGNS

STATEMENT OF RELATED APPLICATIONS

This patent application claims priority from U.S. Provisional Application Ser. No. 60/026,251, filed Sep. 17, 1996. The contents of the provisional application are herein incorporated by reference.

BACKGROUND OF THE INVENTION

The present invention relates to methods and systems that allow distribution of information to potential customers for limited use, while restricting full revelation of the information to customers. Furthermore, the present invention relates to such protection of information even when the information may be distributed separately from a computer application program which uses the information. A particularly appropriate implementation of the present invention is in the area of Electronic Design Automation (EDA) for logic devices.

The industry trend is toward electronic logic devices of increasingly large size and complexity. Simultaneously, market forces have reduced the amount of time practically available for developing such logic devices. In this environment, designers of logic devices, including designers who program Programmable Logical Devices (PLDs), increasingly find it cost-effective to purchase pre-designed building blocks for licensed use in their own designs. These building blocks are logic designs that implement defined logical "functions." Examples of functions offered by design vendors include a Direct Memory Access (DMA) Controller and a Fast Fourier Transform (FFT) Computation Unit.

As the size and complexity of function designs offered by vendors have grown, it has become increasingly difficult for a designer to predict merely from a vendor's datasheets and sales materials whether a given function design will fit as expected into the designer's own overall logic design. This difficulty arises, for example, because design parameters such as circuit placement and routability are affected by interplay between the vendor's function design and the rest of the designer's logic design and therefore cannot be well characterized in advance by the vendor for all potential customers (designers).

In general, a designer will be convinced that a vendor's function design will fit properly into the designer's overall design only after testing the function design using an EDA computer application program such as the MAX+PLUS II program available from Altera Corporation of San Jose, Calif. (the assignees of the present invention). In particular, the designer would want to "compile" the function design into the designer's overall design to verify circuit fitting, timing, and/or other gross statistics. Furthermore, the designer may want to perform detailed functional and/or timing simulation of the compiled overall design to verify correct logical and/or timing performance. Such compilation or simulation are examples of processing that is more than mere reproduction of portions of the function design.

In general, then, a designer is reluctant to purchase a license for a function design unless he or she has first successfully processed the function design using an EDA computer application program. However, vendors generally refuse to provide their function designs to designers for EDA processing unless the designer has already purchased a license. The reason is that once a designer (potential customer) has received a function design for EDA processing, vendors have little practical assurance that the designer will act in good faith. More particularly, vendors fear that a designer might refuse to purchase a license but secretly retain a copy of the function design for unauthorized (i.e., unlicensed) use.

The vendors' fears are especially well-founded if the function design in question is intended for use in programming PLDs, such as those manufactured by Altera Corporation. The reason is that PLDs (unlike, for example, gate arrays, or GAs) are typically programmed in relatively small batches by a relatively large number of customers. It would be difficult and expensive, in general, for a vendor to police and enforce its rights against such customers once the customers already have obtained a copy of the function design.

The vendors' understandable refusal to make their function designs available for trial processing is a serious impediment to efficient adoption of functions provided by vendors into logic devices developed by designers.

What is needed are methods and systems for allowing distribution of information to potential customers for limited use for evaluation, while restricting full revelation of the information to customers. What is particularly needed are methods and systems for allowing distribution of function designs to designers for limited processing using an EDA computer application program for evaluating the function designs while restricting full revelation of the function design to the designers.

SUMMARY OF THE INVENTION

The present invention provides methods and systems for restricting full revelation of certain information to a user, while also performing limited processing of the information for the user for evaluation.

According to an embodiment of the invention, there is a method for restricting full revelation of certain information to a user while permitting some processing by the computerized system of the information for the user. The method includes the steps of accepting, in a computer application program running on the computerized system, an encrypted representation of the information, the encrypted representation not being readily decryptable by the user to fully reveal the information; accepting an authorization code for the user, the authorization code indicating permissions with regard to the information; accepting a request from the user for an output product, the requested output product obtainable from processing input data including the information, the requested output product being more than mere reproduction of a part of the information; decrypting a portion of the encrypted representation into an internal representation of the portion of the information if the authorization code indicates permission to receive the requested output product, the internal representation not readily accessible to the user in a manner that fully reveals the portion of the information; processing the internal representation of the portion of the information to generate the requested output product if the authorization code indicates permission to receive the requested output product; and outputting the requested output product to thereby make it available to the user only if the authorization code indicates permission to receive the requested output product.

According to a further specific embodiment of the invention, the computer application program is an Electronic Design Automation (EDA) tool, the information includes a logic function design, and the processing step includes compiling the internal representation of the portion of the information into an overall logic design.

According to a further specific embodiment of the invention, the authorization code indicates permissions which are specific to a set of users including the user, and the method further includes the step of accepting an identity of the user from a hardware device that indicates the identity.

A further understanding of the nature and advantages of the present invention may be realized by reference to the remaining portions of the specification and the drawings.

DESCRIPTION OF SPECIFIC EMBODIMENTS

I. Processing The Information: Discussion 1

Figure 1:
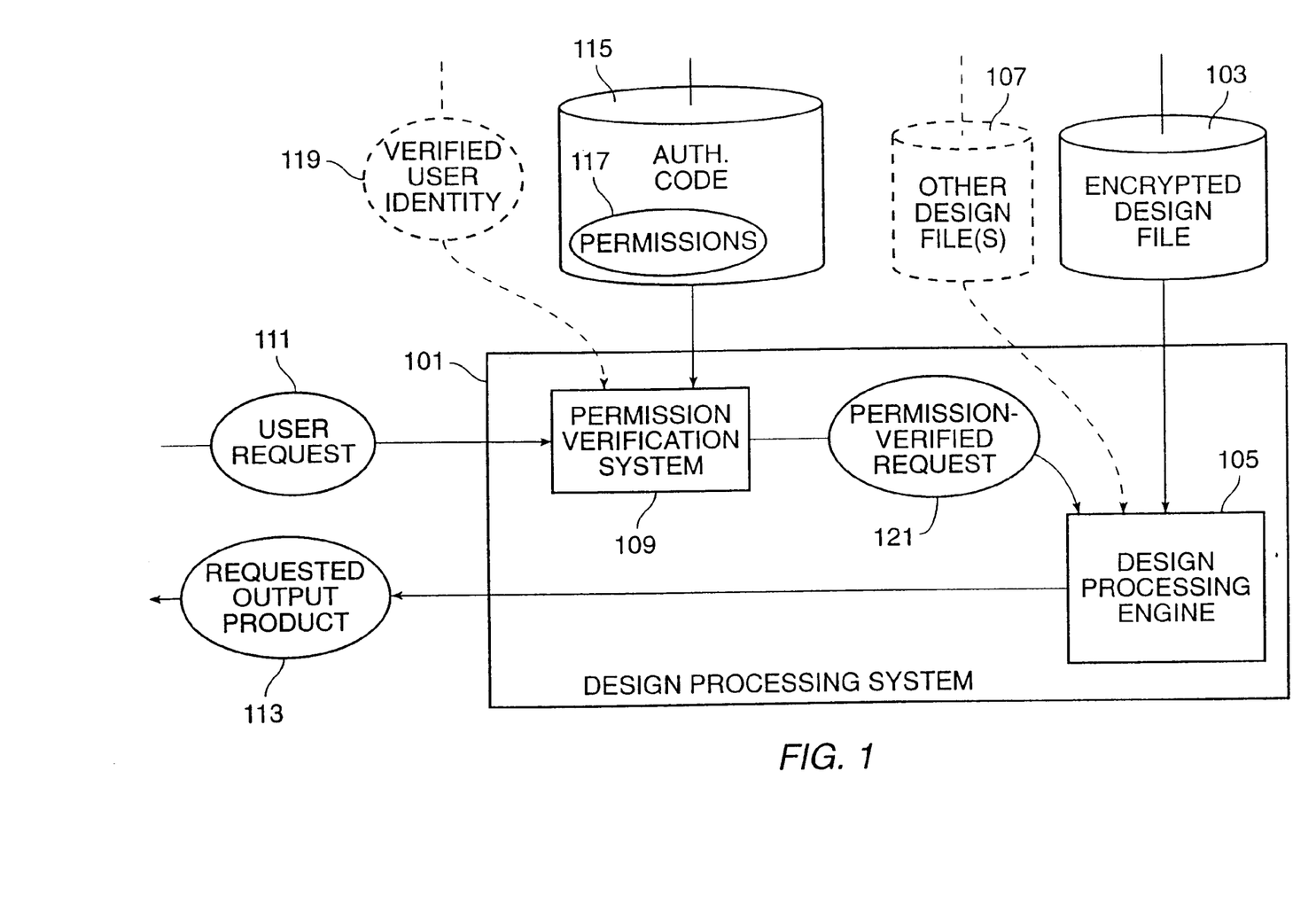
FIG. 1 is a block diagram of a system for restricting full revelation of information to a user while permitting some processing of the information for the user, according to an embodiment of the present invention.

FIG. 1 is a block diagram of a system 101 for restricting full revelation of information contained in an encrypted design file 103 to a user while permitting some processing of the information for the user, according to an embodiment of the present invention. In particular, the system 101 of the embodiment is a design processing system 101 for processing design information.

A design processing engine 105 within the system 101 accepts the encrypted design file 103 for possible processing. The encrypted design file 103 is accepted from for example the user (not pictured). The user does not know how to decrypt the encrypted design file 103. Therefore, even though the user may have access to the encrypted design file 103, the user cannot decrypt the encrypted design file 103. The design processing engine 105 optionally also receives other design file(s) 107. For simplicity of discussion only, the other design file(s) 107 are assumed not to be encrypted.

A permission verification system 109 within the system 101 accepts a user request 111 from the user. The request 111 is a request for an output product 113 which would be produced, if permitted, from processing the encrypted design file 103 in possible combination with the other design file(s) 107. The permission verification system 109 also accepts an authorization code 115 that indicates permissions 117 for the user with regard to the encrypted design file 103.

In an embodiment of the invention, the permissions 117 include the following four elements:

1. Identification of the class of encrypted design files, including the encrypted design file 103, to which the permissions 117 apply, the identification made up of a vendor identification (ID) code and a product ID code.

2. Identification of the set of applicable users, including the user, to which the permissions 117 apply, the identification made up of a "dongle number" (in some implementations, the set of applicable users simply defaults to "all users").

3. The classes of output products which the applicable users have permission to receive—i.e., the access privileges.

4. For each of the classes of access-permitted output products, any expiration date on the applicable users' permissions to receive those output products.

In embodiments of the invention, the permission verification system 109 also accepts the user's verified identity 119 from the user. In these embodiments, the permissions 117 are specific to the user's verified identity 119. In a specific embodiment, the user's verified identity 119 is implemented as a unique hardware "dongle" that indicates a unique identification number for the user or set of authorized users. The dongle plugs into a serial, parallel, or other port of a computer on which the system 101 is implemented. In other embodiments, the user's (users') verified identity 119 is instead implemented as a software dongle, a fingerprint reading, a retina reading, a voice signature reading, the user's "smart card", an Ethernet card identification code or other hardcoded machine identification code such as a networked host computer identification code, or a combination of some of these and other implementations of the user's verified identity.

The permission verification system 109 looks up the type of requested output product 113 in the permissions 117. If the permissions 117 indicate that the user has permission to receive the requested output product 113, the permission verification system 109 indicates this permission, thereby converting the user request 111 into a permission-verified request 121. The permission-verified request 121 may be implemented as simply the original user request 111 plus a flag that indicates permission.

The design processing engine 105 accepts the permission-verified request 121 and performs processing of the encrypted design file 103 to generate the requested output product 113 and output it to the user. In processing the encrypted design file 103, the design processing engine 105 generally must decrypt at least a relevant portion of the encrypted design file 103.

In a specific embodiment, the user is a designer wishing to test the encrypted design file 103 for suitability to the user's task. In particular, the user is a logic designer and the encrypted design file 103 includes a function's logic design which the user hopes to incorporate into his overall logic design. The other design file(s) include logic designs for the remainder of the user's overall logic design.

Given the protection of intellectual property made possible by the present invention, a vendor who creates the encrypted design file 103 may find it convenient to make his encrypted design file 103 freely available to the public, perhaps via download on the World Wide Web. Thus, instead of having to guard distribution of the actual design files, as required under former practice, the vendor need only guard distribution of authorization codes, which tend to be smaller and easier to manage. Furthermore, identical copies of the encrypted design file 103 can be provided to different licensees, even though the different licensees purchase different levels of permissions (in the form of different authorization codes 115) with regard to the encrypted design file 103.

According to one embodiment of the invention, the design processing engine 105 inherently knows how to decrypt the encrypted design file 103. In this one embodiment of the invention, the system 101 requires the vendor to create the encrypted design file 103 such that the encrypted design file 103 may be decrypted by a decryptor (including any decryption key) that is built into the design processing engine 105. This embodiment has a flaw in that the decryption key is known to the developer/supplier of the design processing engine 105, and the vendor must trust the developer/supplier to guard that key carefully because if that key becomes known, then ANYONE can use the key to steal the vendor's intellectual property. Furthermore, the vendor must trust the developer/supplier not to use its key to steal the vendor's intellectual property.

Another embodiment of the invention will be described in connection with FIGS. 3 and 4 that avoids the flaw discussed in the previous paragraph by making even the developer/supplier of the design processing engine 105 unable to read the vendor's encrypted design file 103 without an authorization code 115 from the vendor.

II. Encrypting the Design File

Figure 2:
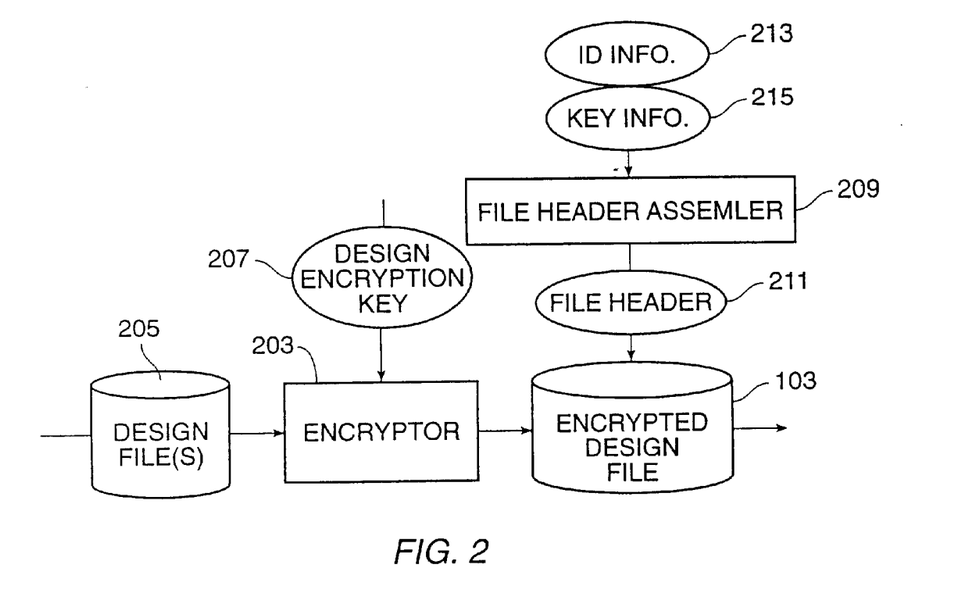
FIG. 2 is a block diagram showing generation of the encrypted design file of FIG. 1, according to an embodiment of the present invention.

FIG. 2 is a block diagram showing generation of the encrypted design file of FIG. 1, according to an embodiment of the present invention.

In FIG. 2, an encryptor 203 accepts clear-text design file(s) 205 that contain information to be protected. Using an encryption algorithm, the encryptor 203 converts the clear-text design file(s) 205 into the cipher-text, encrypted design file 103. In performing this encryption, the encryptor 203 uses an encryption key 207, hereinafter referred to as the design encryption key 207.

Various algorithms for encryption are known and available to system developers. These algorithms include RSA, PGP, DES, etc. RSA is available from RSA Data Security, Inc. of Redwood City, Calif. PGP is available from Pretty Good Privacy, Inc. of San Mateo, Calif. PGP and Pretty Good Privacy are trademarks of Pretty Good Privacy, Inc. DES, or Data Encryption Standard, is a public standard published by the United States National Institute of Standards and Technology (NIST) in Federal Information Processing Standards (FIPS) Publication 46-2: Data Encryption Standard, December, 1993, which is hereby incorporated by reference.

Many encryption algorithms, whether they are "public-key" algorithms or not, would be adequate for use in the embodiment of FIG. 2, so long as they perform the function of converting clear-text into cipher-text which cannot readily be decrypted by the potential information thief (e.g., the user) but which can be simply decrypted by the entity needing to decrypt the cipher-text (i.e., the design processing engine 105). As will be discussed in connection with FIGS. 3–4, preferably, the encryption algorithm chosen would permit the party performing the encryption (i.e., the vendor) to specify a decryption key, hereinafter referred to as the design decryption key, to be used for decrypting the encrypted design file 103.

In encrypting the design file(s) 205 for use with the design processing system 101 (of FIG. 1), the particular design encryption key 207 is chosen because it is known to create an encrypted design file 103 which can be decrypted using a decryption key which will be available to the design processing system 101.

In a specific embodiment of the invention, the well-known DES encoding algorithm is used by the encryptor 203. DES is a symmetric cryptosystem, which means that the same key is used for encryption and decryption. DES is an encryption block cipher defined and endorsed by the U.S. government in 1977 as an official standard. The DES standard is fully explained in the official publication referred to and incorporated above. Implementation of the DES standard is further described in NIST, FIPS Publication 74: Guidelines for Implementing and Using the NBS Data Encryption Standard, April, 1981, which is hereby incorporated by reference.

In FIG. 2, A file header assembler 209 accepts information to be placed in a file header 211 into the encrypted design file 103. The information includes ID information 213 which identifies the information being protected. In an embodiment of the invention, the identification information 213 includes a vendor ID code and a product ID code. The information to be placed in the file header 211 also includes key information 215 that gives information related to the decryption key, which information is to be used by the design processing system 101 in decrypting the encrypted design file 103.

In a particular embodiment of the invention, the creation of the encrypted design file 103, including its header 211, may be partially summarized in the following steps (which need not necessarily be taken in the order presented):

Step A: Encrypt (using DES) the vendor ID code and the product ID code into a "Tag A" using a "system encryption key" (307 of FIG. 3, to be discussed below). The system encryption key 307 is a DES key that is guaranteed to be possessed by the design processing system 101 (of FIG. 1), for example because the key is known to be built into the design processing system 101.

Step B: Take a "design encryption subkey" and modify it using combination with the vendor ID code and the product ID code. The result is the design encryption key 207, a DES encryption/decryption key.

Step C: Encrypt (using DES) the design encryption key 207 into a "Tag B" using the design encryption subkey as a DES key.

Step D: Encrypt (using DES) the design file(s) 205 into the encrypted design file 103 using the design encryption key 207 as a DES key.

Step E: Append Tag A and Tag B to the front of the encrypted design file 103. Tab B is the key information 215.

III. Generating the Authorization Code

Figure 3:
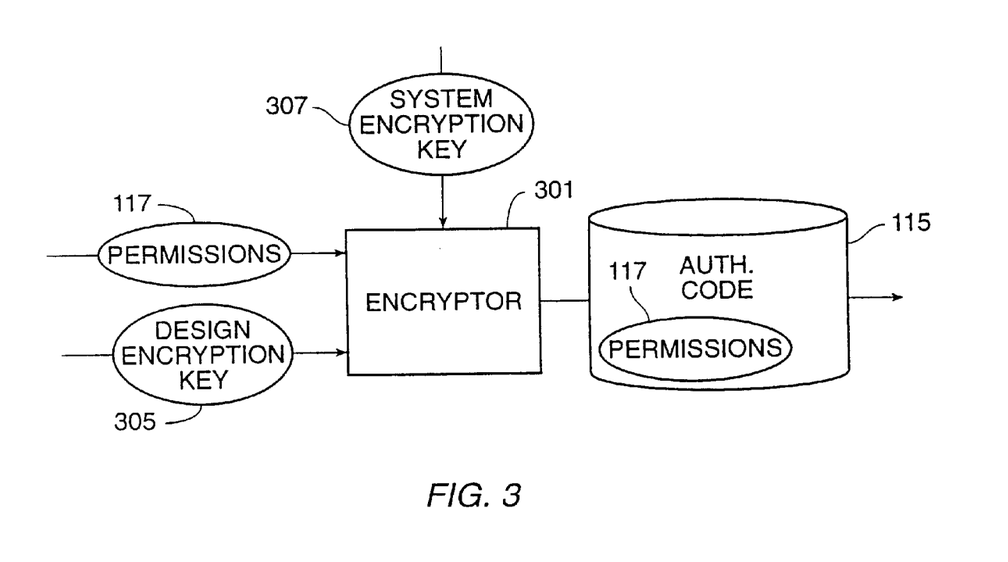
FIG. 3 is a block diagram showing generation of the authorization code of FIG. 1, according to an embodiment of the present invention.

FIG. 3 is a block diagram showing generation of the authorization code 115 of FIG. 1, according to an embodiment of the present invention.

In FIG. 3, an encryptor 301 accepts, as clear-text, the permissions 117 granted for the user with regard to the information in the encrypted design file 103 (not shown in FIG. 3). The encryptor 301 also accepts a design decryption key 305 with which the encrypted design file 103 may be decrypted. The design decryption key 305 may be the actual key used for decrypting according to the decrypting algorithm, or it may simply contain crucial information that specifies a key actually used in the algorithmic decoding.)

Using an encryption algorithm, the encryptor 301 converts the clear-text permissions 117 and the design decryption key 305 into the encrypted authorization code 115. In performing this encryption, the encryptor 301 uses an encryption key, herein referred to as the system encryption key 307. In general, the encryptor 301 and the encryptor 203 (of FIG. 2) may use the same encryption algorithm, such as the DES algorithm.

In the "particular" embodiment of the invention discussed using Steps A to E in Section II, the encryptor 301 does not actually accept the design decryption key 305 as shown in FIG. 3. Instead, the encryptor 301 accepts the "design decryption subkey" mentioned in Step B in Section II. The encryptor 301 then encrypts the "design decryption subkey" along with the permissions 117 into the authorization code 115.

IV. Processing Information: Discussion 2

Figure 4:
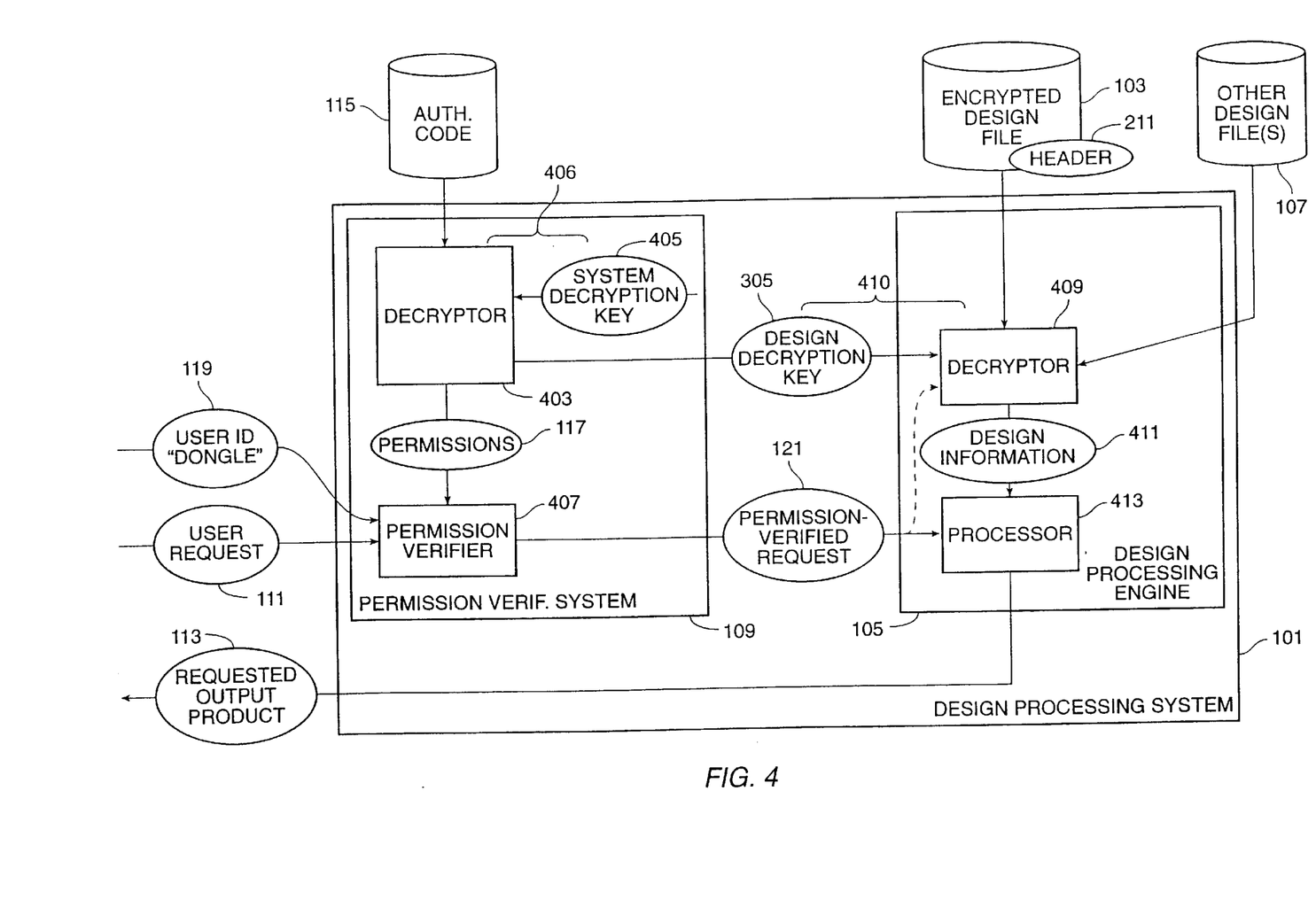
FIG. 4 is a block diagram which shows the system of FIG. 1 in greater detail, according to an embodiment of the invention.

FIG. 4 is a block diagram which shows the design verification system 101 of FIG. 1 in greater detail, according to an embodiment of the invention. In FIG. 4, features sharing a same label number as features in previous figures are the same features as found in the previous figures, and previous discussions of these features are applicable.

In FIG. 4, a decryptor 403 within the permission verification system 109 decrypts the authorization code 115 using a system decryption key 405 to obtain therefrom the permissions 117 and a design decryption key 305. The combination of the decryptor 403 and the system decryption key 405 may be referred to as the "system decryptor" 406. Because the system decryption key 305 is not known by the user, the system decryptor 406 is not available to the user. Therefore, even though the user may have access to the authorization code 115, the user cannot decrypt the authorization code 115.

A permission verifier 407 within the permission verification system 109 accepts the user request 111 and user identity dongle 119 and the permissions 117. The permission verifier 407 checks the permissions 117, and, if the user request 111 is within the user's permitted access privileges, transforms the user request 111 into the permission-verified request 121.

In an embodiment of the invention, the permissions 117 may include expiration dates on certain access privileges. Therefore, the permission verifier 407 will confirm that the current date (e.g., the system date on a computer system) is earlier than the expiration date of an otherwise-available access privilege. The permission verifier 407 also checks for evidence that the system date on a computer has been tampered with, so as to thwart unscrupulous users who try to reset the system clock to an earlier date to fool the system. If such evidence of cheating is found, the permission verifier 407 denies permission.

A decryptor 409 within the design processing engine 105 decodes the encrypted design file using the design decryption key to obtain design information 411 which is to be protected by the present invention. The design information 411 exists as an internal representation which is not readily accessible to said user in a manner that fully reveals the design information 411. (For example, the internal representation may exist only as run-time variable values in random access memory (RAM), which values are not readily accessible to the user for understanding the design information 411.) The combination of the decryptor 409 and the design decryption key 305 may be referred to as the "information decryptor" 410. The information decryptor 410 is a decryptor which is "specified" by the design decryption key 305, in the sense that once the design decryption key 305 is known, then the information decryptor 410 is known, given a particular decryption algorithm (e.g., DES).

In a specific embodiment, the decryptor 409 performs a test using the design decryption key 305 and a header 211 from the encrypted design file 103 to verify correctness of the design decryption key 305, as will be described below.

In a specific embodiment, the decryptor 409 performs its decryption only upon a first permission-verified request 121 during a single session of running the design processing system 101. Thereafter, the design processing system maintains the design information 411 so as to be available for subsequent processing necessitated by subsequent permission-verified requests request 121.

A design processor 413 performs processing upon the design information 411 from the encrypted design file 103 and design information from the other design file(s) 107. The design processor outputs the output product 113 which was requested in the permission verified request 121.

In the "particular" embodiment of the invention discussed using Steps A to E in Section II, which uses DES encryption, operation of the design processing system 101 may be partially summarized in the following steps (which need not necessarily be taken in the order presented):

Step P: Accept the authorization code from the user.
Step Q: Decrypt the authorization code using a system DES key 307 (of FIG. 3) as the system decryption key 405 to obtain the permissions 117, including the vendor ID code and the product ID code; and maintain the permissions 117 within the system for use in handling subsequent requests from the user.
Step R: Accept the user request 111.
Step S: Determine from the permissions 117 whether the user has permission to have his request 111 be executed.
Step T: Reconstruct the design decryption key 305 according to Step B in Section II's discussion; i.e., by modifying the "design encryption subkey" from the authorization code 115 by combining it with the vendor ID code and the product ID code.
Step U: Verify correctness of the design decryption key 305 by recreating "Tag B" according to Step C in Section II's discussion, and confirming that the recreated Tag B is identical to the Tag B found in the header 211 of the encrypted design file 103.
Step W: Use the verified design decryption key 305 to decrypt the encrypted design file 103 into an internal representation of design information 411.
Thereafter: Proceed to use design information 411 so long as the user has permission, as discussed above.

V. Processing Information: Discussion 3

Figure 5:
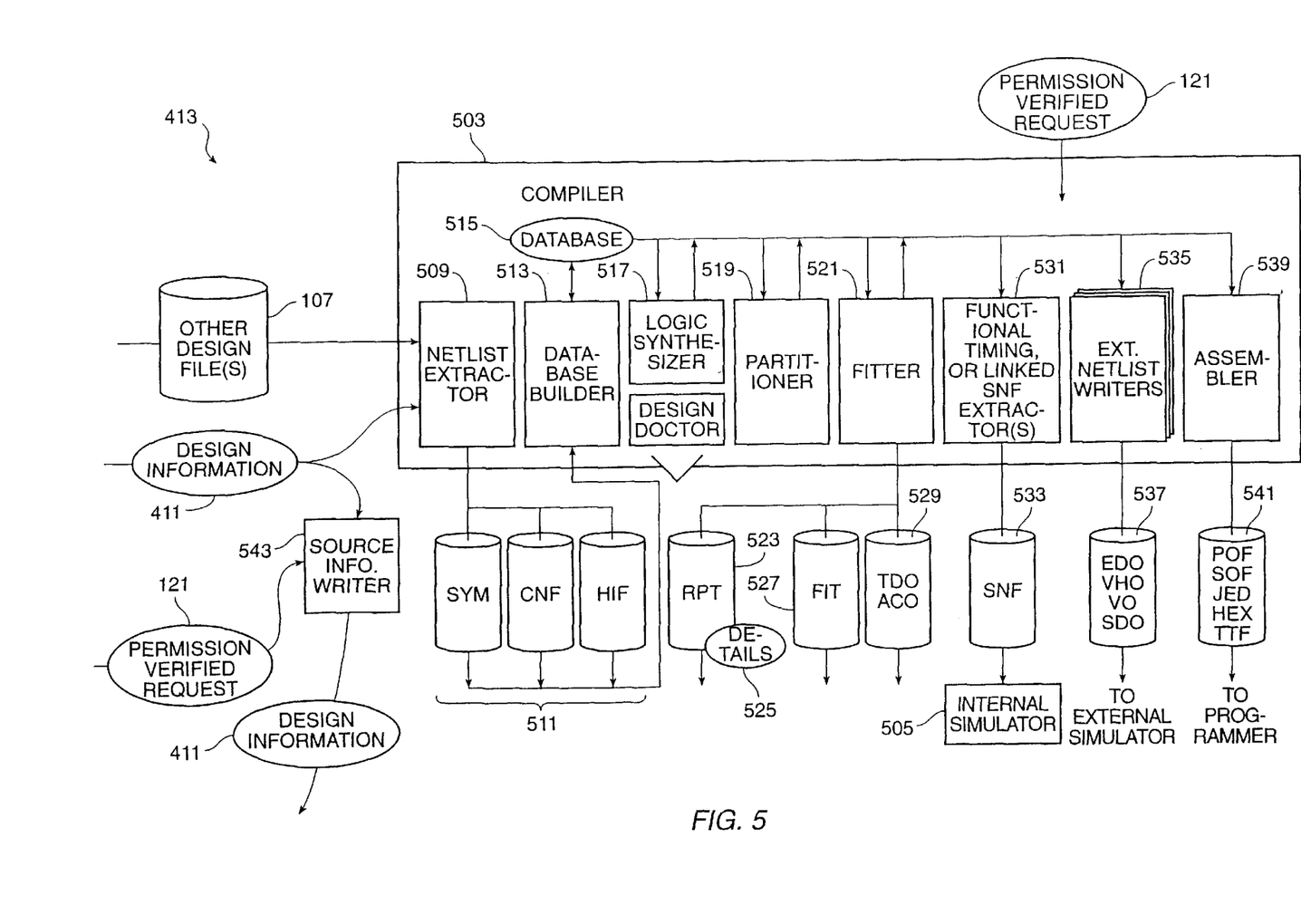
FIG. 5 is a block diagram showing the design processor 413 of FIG. 4 as a logic development system 413 according to an embodiment of the present invention.

FIG. 5 is a block diagram showing the design processor 413 of FIG. 4 as a logic development system 413 according to an embodiment of the present invention.

In the embodiment shown in FIG. 5, the logic development system 413 is part of a computer application program running on a computer such as an industry-standard Intel-compatible Personal Computer (PC) or RISC workstation under an operating system such as the industry-standard Windows operating system from Microsoft Corporation or operating systems such as AIX from IBM, Solaris from Sun Microsystems, or HP-UX from Hewlett-Packard. "Intel," "Windows," "AIX," "Solaris," and "HP-UX" are trademarks of their respective owners.

The protection to intellectual property made possible by the present invention is all the more useful, given that the computer application program is not restricted to running only on "secure" computers within a vendor's physical premises. Instead, the computer application program may itself be owned by the user, and may be run even on the user's own computer, from a file accessible to the user.

A person skilled in the art will understand that the computer application program may be implemented in a variety of ways. For example, the computer application program may include several cooperating modules which run as separate computer processes. These modules, or the entire computer application program, may be platform-independent modules written in a platform-independent computer language such as the Java programming language.

FIG. 5 shows a programmable logic development system 413 including a design compiler 503, an "internal" design simulator 505, and a source information writer 507. The embodiment of FIG. 5 includes all features found in the MAX+PLUS II program available from Altera Corporation. These features are described in detail in the user manual, "MAX+PLUS II Getting Started," which is available from Altera Corporation, for example via the World Wide Web at http://www.altera.com/document/manual/mpgs.pdf. Version 6.0 of this user manual, dated November 1995, which is the version available from the above Web site as of July, 1997, is hereby incorporated by reference.

The compiler 503 receives permission-verified user requests 121 for processing. This means that the compiler 503 performs only those requested actions for which the user has permission. The permission-verified request 121 may be implemented as simply the original user request 111 plus a flag that indicates permission, which flag is checked by the compiler 503 prior to taking action.

A netlist extractor 509 within the compiler 503 accepts design information 411 which is to be protected and also design file(s) 107 which contain additional design information. The design information 411 and the design file(s) 107 are design files conforming to any of a list of supported file formats. As explained in the incorporated manual, "MAX+ PLUS II Getting Started," these formats include, among other formats:

Text Design Files (TDF): which describe logic designs in the Altera Hardware Description Language (AHDL). AHDL is a high-level, modular language.

VHDL Design Files (VHD): which describe logic designs in the Very High Speed Integrated Circuit (VHSIC) Hardware Description Language.

EDIF Input Files (EDF): generated with any standard EDIF netlist writer.

Xilinx Netlist Format Files (XNF): created with Xilinx software from Xilinx, Inc. of San Jose, Calif.

The netlist extractor 509 translates design information from its inputs 411 and 107 into consistent compiler-compatible formats and keeps the translated information in intermediate files 511.

A database builder 513 creates a database 515 that is a compiled, flattened representation of the overall logic design, including all information in design information 411 and the design files 107.

A logic synthesizer module 517 applies a number of algorithms that reduce resource usage and remove redundant logic to ensure that logic cell structure is used as efficiently as possible for the architecture of a target device family of PLDs to be eventually programmed with the overall logic design.

If the overall logic design in the database 515 does not fit into a single device, a partitioner 519 divides the database 515 updated by the logic synthesizer module 517 into multiple devices from the same device family. In this task, the partitioner 519 attempts to split the project into the smallest possible number of devices using a minimal number of pins for inter-device communication.

Using the database 515 updated by the partitioner 519, a fitter 521 matches the requirements of the overall logic design with the known resources of one or more devices. It assigns each logic function to the best logic cell location and selects appropriate interconnection paths and pin assignments. Regardless of whether a fit is achieved, the fitter 521 generates a report file (RPT) 523 that documents fitting information on partitioning, input and output pin names, and unused resources for each device in the project.

Upon (permission-verified) request, the fitter 521 generates the report file 523 to include detailed sections 525 that show user assignments, file hierarchy, logic cell interconnections, and clear-text logic equations. The detailed sections 525 pose a potential danger to the vendor of the encrypted design file in that they reveal aspects of the vendor's design which could meaningfully be understood by the user. In particular, the user can reverse-engineer the vendor's design for purposes of unlicensed use.

The fitter 521 also generates a fit file (FIT) 527 that documents resource and device assignments as well as routing information. Upon (permission-verified) request, the fitter 521 also generates Text Design Output files (TDO) 529 for the fully optimized, fitted overall logic design, with one TDO file generated for each device in a multi-device overall logic design. TDO files are files each of which may subsequently be converted straightforwardly into files usable as input to the compiler 503 in a later design session. For example, TDO files may use a AHDL representation which can easily be edited and saved as a Text Design File (TDF). TDO files pose a danger to the vendor in that the user can use TDO files to create a clear-text functional duplicate of the encrypted design file 103.

The optional Functional SNF Extractor 531, Timing SNF Extractor 531, and Linked SNF Extractor 531 create, upon (permission-verified) request, Simulator Netlist Files (SNF) 533 which can be used by the internal simulator 505 to perform simulation and verification on the design. These SNF extractors 531 create SNF files needed for functional, timing, and multi-project (i.e., multiple "overall designs") simulation. SNFs 533 are of a format which cannot be used by software other than the logic development system 413's internal simulator 505. Therefore, there is a level of safety to the vendor in allowing the user to possess SNFs 533 because the internal simulator 505 is known not to allow activities related to reverse-engineering.

The optional external netlist writers 535, including an EDIF netlist writer, a VHDL netlist writer, and/or a Verilog netlist writer create, upon (permission-verified) request, "external" netlist files 537 in a variety of formats such as EDIF (EDO netlist file), Standard Delay Format (SDO netlist file), VHDL (VHO netlist file), and Verilog (VO netlist file). These external netlist files 537 are termed "external" netlist files because they are suitable for use in a large number of industry-standard simulation systems, as compared to the logic development system 413's "internal" simulator 505. These external netlist files 537 pose a danger to the vendor because the user can use them to reverse-engineer the vendor's logic design.

An assembler 539, upon (permission-verified) request, converts the fitter 521's logic cell, pin, and device assignments into a programming image for the PLD(s) in the form of one or more programming files 541. These programming files can then be sent to PLD programming systems to produce working devices.

A source code information writer 543 provides effective access by the user to the clear-text (i.e., unencrypted) version of the encrypted design file 103 (not shown in FIG. 5). Upon (permission-verified) request, the source code information writer 543 outputs the encrypted design file 103's design information 411 to the user. Revealing the unencrypted clear-text of the vendor's encrypted design file 103 poses perhaps the greatest danger to the vendor.

As discussed in connection with FIG. 5, the present invention allows any vendor to safely supply encrypted versions of his or her digital circuit designs ("megafunctions") to his or her customers for use with the design processing system 101 (of FIG. 4) that includes the logic development system 413 of FIG. 5.

In general, the vendor encrypts his design file as shown in FIG. 2 using a design file encryption system supplied to the vendor by the supplier of the design processing system 101. Because the encrypted design file 103 is protected, the vendor can feel safe in freely distributing copies to all potential clients and to existing clients for upgrade.

To use megafunctions, the customer must first obtain an authorization code from the vendor. The vendor generates authorization codes as shown in FIG. 3 using an authorization code generator supplied to the vendor by the supplier of the design processing system 101.

The vendor may selectively enable specific design compilation features, thus providing different license options. These options include, but are not limited to:

Duration of the license (expiration date)

Access to the megafunction source code

Generation of External simulation file(s) (e.g. Verilog (VO) etc.)

Generation of Text Design Output files (e.g., AHDL TDO files)

Generation of Programming file generation (e.g. Programmer Object File, POF, etc.)

Report file abridgement (e.g. omitting specific logic equations)

By specifying an expiration date, the vendor can offer use of the megafunction for a precise period of time and thus license the megafunction for a "one-time-use".

By not allowing access to the source code, the vendor has the ability to protect his or her intellectual property from unlicensed public exposure.

By not generating "external" simulation files, the vendor prevents the user from reverse-engineering the simulation file for purposes of unlicensed use.

By not generating Text Design Output files (TDO) the vendor prevents the user from creating a clear-text duplicate of the original encrypted megafunction.

By not generating programming files, the vendor prevents the user from generating the files which are used to program and configure the PLD.

By abridging the report file, the vendor prevents the user from using the clear-text equations to reverse engineer the megafunction for purposes of unlicensed use.

One particular license option is a "test-drive" whereby a vendor would allow a customer to compile their encrypted megafunction, but would not allow the customer to generate any external simulation files or any programming files. The compilation will generate report file (to demonstrate fittings statistics) and "internal" simulation files (to allow performance evaluation of the megafunction). The vendor would provide this authorization code to the customer at no cost, allowing the customer to evaluate the megafunction prior to purchase.

When encrypting the files, each vendor supplies his or her own encryption keys, which are never known by the supplier of the design processing system 101, and a product ID number, which allows the vendor to group sets of files under the same authorization code. Each vendor is given a unique vendor ID code, which is assigned by the supplier of the design processing system 101. The vendor ID code may be built into the design file encryption system and the authorization code generator provided to the vendor by the supplier of the design processing system 101.

In the case where the supplier of the design processing system 101 is itself the vendor, the design processing system 101 will automatically give the user "try-before-you-buy" access without requiring an authorization code. When the user wants to generate results or view the source files, the user must acquire an authorization code for that user from the vendor.

The invention has now been explained with reference to specific embodiments. Other embodiments will be apparent to those of ordinary skill in the art in view of the foregoing description. It is therefore not intended that this invention be limited, except as indicated by the appended claims.

What is claimed is:

1. A method for restricting information to a user of a computerized system, wherein the computerized system includes stored encrypted information, the computerized system further including a user input device and a processor, the method comprising the steps of:

identifying an authorization code for said user, said authorization code indicating permissions with regard to said information;

accepting, via the user input device, a request from said user for an output product;

using the processor to derive the output product from a portion of the encrypted information; and outputting said requested output product to thereby make it available to said user only if said authorization code indicates permission to receive said requested output product.

2. The method of claim 1 wherein:

a portion of said authorization code is encrypted, said encrypted portion of said authorization code being not readily decryptable by said user; and said step of accepting said authorization code comprises decrypting said encrypted portion of said authorization code using an authorization code decryptor that is unavailable to said user.

3. The method of claim 2 wherein:

said step of accepting said authorization code comprises accepting said authorization code from said user, said authorization code being accessible to said user but said encrypted portion of said authorization code being not readily decryptable by said user.

4. The method of claim 2 wherein:

said authorization code includes a specification of an information decryptor for decrypting said encrypted representation of said information; and said step of decrypting said portion of said encrypted representation comprises decrypting said portion of said encrypted representation using said specified information decryptor, responsive to said authorization code accepting step.

5. The method of claim 4 wherein:

said specification of said information decryptor is in said encrypted portion of said authorization code; and said step of accepting said authorization code comprises extracting said specification from said authorization code after said decrypting of said encrypted portion of said authorization code in said authorization code accepting step.

6. The method of claim 1 wherein said computer application program is an Electronic Design Automation tool and said information comprises a logic function design.

7. The method of claim 6 wherein said processing step comprises compiling said internal representation of said portion of said information into an overall logic design.

8. The method of claim 7 wherein:

the method further comprises the step of accepting design data additional to said information; and said processing step comprises compiling said additional design data along with said internal representation of said portion of said information into said overall logic design.

9. The method of claim 7 further comprising, not necessarily in said computerized system, the step of providing said authorization code to said user, said authorization code indicating whether permission exists to receive at least one of a simulation file usable as an input to a circuit simulator, a programming file usable in programming a programmable logic device, and a nonencrypted design file suitable for use as input in said computer application program.

10. The method of claim 1 further comprising, not necessarily in said computerized system, the steps of:

providing said authorization code to said user, said user herein referred to as the first user and said authorization code herein referred to as the first authorization code;

providing a second authorization code to a second user, said encrypted representation of said information being also accessible to said second user, said second authorization code indicating permissions for said second user with regard to said information, said permissions for said second user including a permission for said second user to receive at least one output product derived from said information that said first user is not permitted by said first authorization code to receive.

11. The method of claim 1 wherein said authorization code indicates permissions which are specific to a set of users including said user, the method further including the step of accepting an identity of said user.

12. The method of claim 11 wherein the step of accepting said identity of said user comprises accepting said identity from a hardware device that indicates said identity.

13. The method of claim 1 wherein:

said authorization code includes a specification of an information decryptor for decrypting said encrypted representation of said information; and said step of decrypting said portion of said encrypted representation comprises decrypting said portion of said encrypted representation using said specified information decryptor, responsive to said authorization code accepting step.

14. The method of claim 1 wherein said step of accepting said encrypted representation of said information comprises accepting said encrypted representation of said information from a data file which is separate from program files of said running application program.

15. The method of claim 1 wherein in said processing step said internal representation is processed to generate said requested output product only if said authorization code indicates permission for said user to receive said requested output product.

\* \* \* \* \*